United States Patent [19]

Daily

[11] Patent Number: 5,000,121
[45] Date of Patent: Mar. 19, 1991

[54] MODULAR CAGE STRUCTURE

[76] Inventor: Raymond P. Daily, 2270 Camino Vida Roble, Suite I, Carlsbad, Calif. 92001

[21] Appl. No.: 500,234

[22] Filed: Mar. 26, 1990

Related U.S. Application Data

[63] Continuation of Ser. No. 246,807, Sep. 20, 1988, abandoned.

[51] Int. Cl.$^5$ ............................................. A01K 31/08
[52] U.S. Cl. ...................................... 119/17; 446/126
[58] Field of Search ............................. 119/17, 18, 19; 446/105, 108, 110, 111, 112, 113, 114, 122, 126, 119, 423, 478; 403/292, 294, 375; 16/386, 380, 383, 378; 52/66, 280, 262

[56] References Cited

U.S. PATENT DOCUMENTS

| | | | |
|---|---|---|---|
| 162,142 | 4/1875 | Belmer | 119/17 |
| 167,325 | 8/1875 | Fisher | 119/17 |
| 415,769 | 11/1889 | Drewitt | 119/17 |
| 702,993 | 6/1902 | Pitts | 119/17 |
| 1,227,814 | 5/1917 | Maxwell | 119/17 |
| 1,508,458 | 9/1924 | Litschgi | 119/17 |
| 1,556,346 | 10/1925 | Poplawski et al. | 119/17 |
| 2,864,335 | 12/1958 | Yellin | 119/17 |
| 3,467,064 | 9/1969 | Glass et al. | 119/17 |
| 3,736,035 | 5/1973 | Brown et al. | 403/375 X |
| 4,478,175 | 10/1984 | Fisher et al. | 119/20 X |
| 4,807,330 | 2/1989 | Gomes | 16/386 X |
| 4,901,672 | 2/1990 | Rosenberger | 119/19 |

FOREIGN PATENT DOCUMENTS

| | | | |
|---|---|---|---|
| 0543772 | 7/1957 | Canada | 446/110 |
| 0810488 | 8/1951 | Fed. Rep. of Germany | 446/110 |
| 0521347 | 3/1955 | Italy | 119/17 |
| 0655184 | 7/1963 | Italy | 446/126 |

Primary Examiner—Robert P. Swiatek
Assistant Examiner—Todd E. Manahan
Attorney, Agent, or Firm—Brown, Martin, Haller & McClain

[57] ABSTRACT

A cage structure consists of a roof member and base member each having a bore at each of its corners, and a series of wall members releasably securable together and to the roof and base members to form an enclosure. Each wall member also has a bore at each of its corners. Three way connectors or joints releasably connect the corners of the adjacent three members at each corner of the cage. Each three way connector has three arms which engage in the respective bores of the three members at that corner to secure the members together, so that a major part or all of the connector is concealed when the cage is assembled.

16 Claims, 3 Drawing Sheets

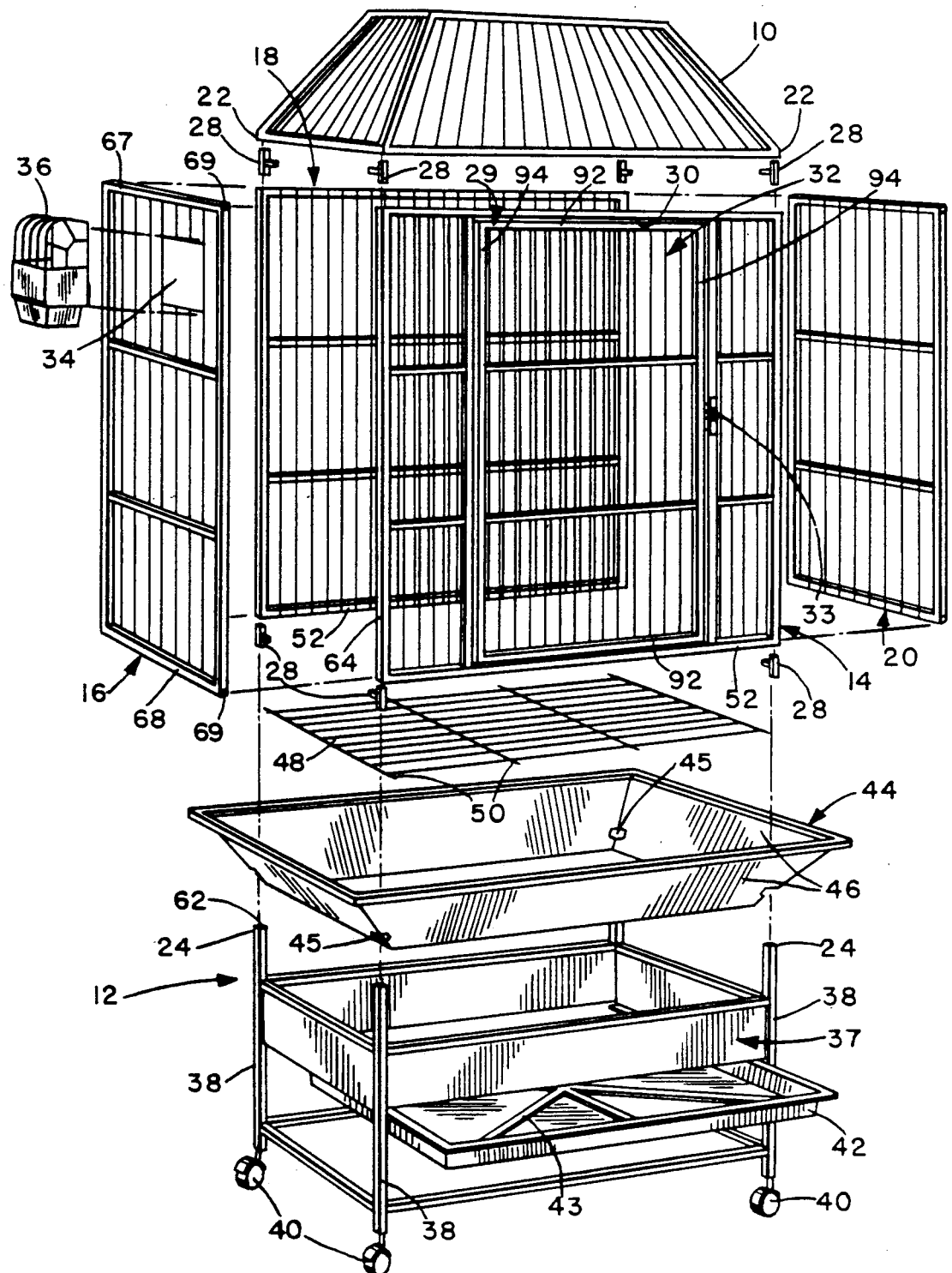
FIG. I

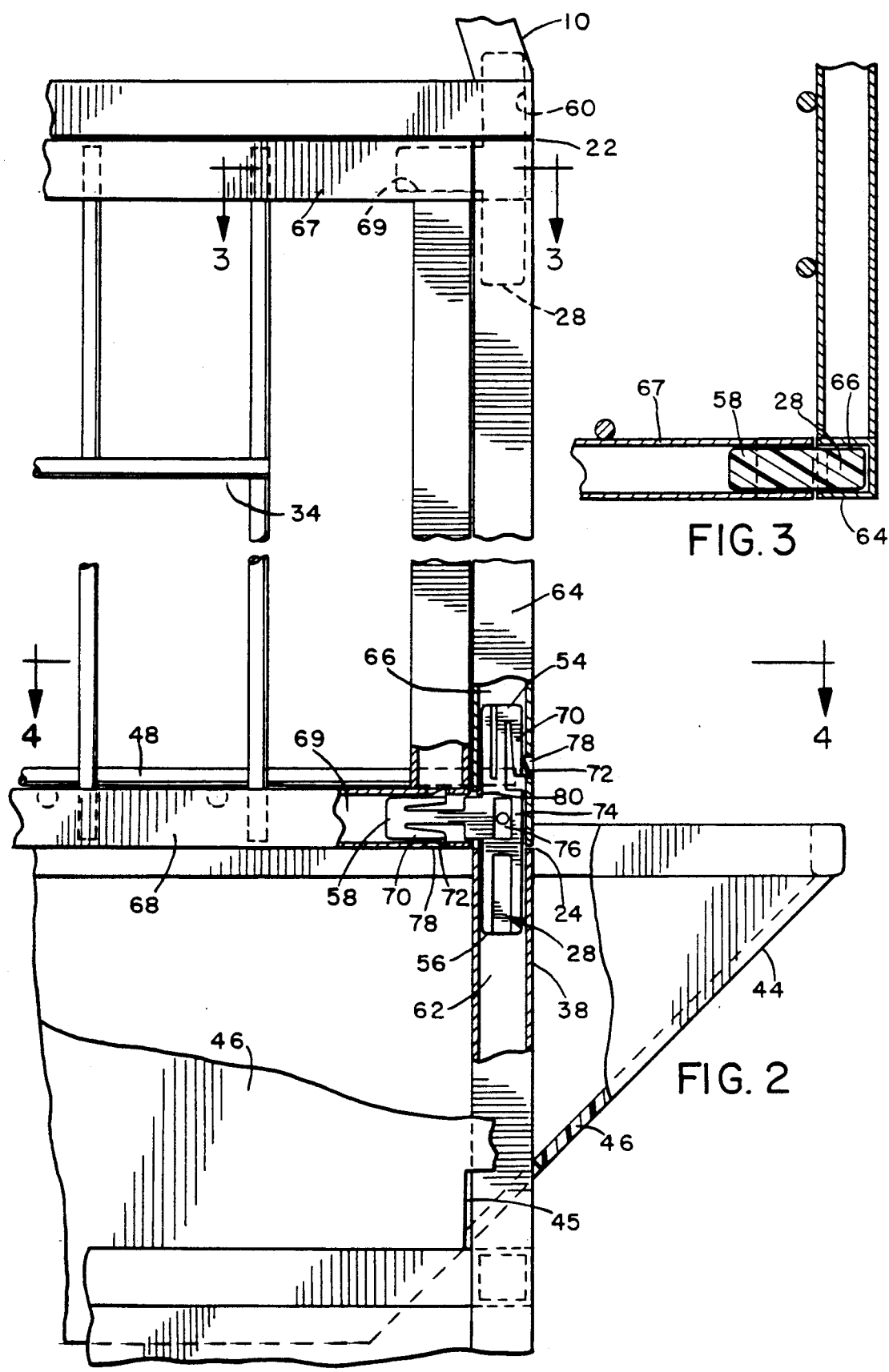

MODULAR CAGE STRUCTURE

This is a continuation of application of Ser. No. 07/246,807, filed Sept. 20, 1988, now abandoned.

BACKGROUND OF THE INVENTION

The present invention relates generally to cages, and more particularly to cages for birds or other animals.

Bird cages generally consist of a roof, floor and wall structure which may be permanently welded together or which may be secured together by fasteners such as nuts and bolts or screws. Permanent cage structures take up a lot of space during storage or transportation when not in use, and conventional fasteners for collapsible cages result in protruberances which may be hazardous to a bird or other animal in the cage. Also, assembly of such cages involves specialized tools and is generally relatively difficult and time consuming.

SUMMARY OF THE INVENTION

It is an object of the present invention to provide an improved collapsible or modular cage structure.

According to the present invention, a cage structure is provided which comprises a roof member, a base member, and a series of wall members for releasably securing to the corners of the roof member and base member to form an enclosure. Each member has a bore at each of its corners. A series of identical, three way connectors or joints are provided for releasably connecting the wall panels, roof member and base structure together at the upper and lower corners of the cage. The three way connectors each have three arms for releasably fastening in the respective three bores at the respective adjacent corners of the adjacent three members of the cage at each corner. The connector arms may be designed for locking or latching engagement in some or all of the bores at each corner, or may have a frictional fit in the bores where less strength is needed in the cage structure, for example with relatively small birds who would be unable to separate the members easily.

Since the connectors engage within the bores, they are partially or completely hidden and do not project to form any protruberances. This provides an improved appearance to the cage and also eliminates projections which could injure the occupant of the cage.

In the preferred embodiment of the invention, the connectors are all identical and each comprise a pair of aligned arms projecting in opposite directions with a third arm projecting at right angles to the aligned arms at the junction between the aligned arms. The roof member preferably has downwardly facing bores at its four corners, while the base member has similar upwardly facing bores at its corners. The wall members, which are each of rectangular shape, each have a peripheral frame consisting of spaced side bars and spaced upper and lower bars, with a suitable grille or framework extending across the space between the bars. Preferably, the side bars at least of one pair of opposed wall members are of hollow channel section while the upper and lower bars of the other pair of opposed wall members are of hollow channel section, the hollow bars being open at their opposite ends to form the corner bores for receiving the connectors.

The oppositely directed aligned arms of the connectors at each of the four upper corners of the cage can therefore be urged into the downwardly facing bore of the respective corner of the roof and into the upper open end of the side bar of one of the wall members at that corner, while the third limb is urged into the open end of the upper bar of the other wall member at that corner. Similarly, the lower corner joints are made by urging the oppositely directed aligned arms of the connectors at each corner into the upwardly directed channel or bore of the base member at that corner and the lower open end of the side bar of one of the wall members at that corner, while the third limb is urged into the open end of the lower bar of the other wall member at that corner.

Preferably, the bores are of square cross section while the connector arms have a similar square cross section for mating engagement in the ends of the bores or channels. They may simply be dimensioned to have a close frictional fit in the channels, or alternatively may have spring loaded projections or protruberances for frictional engagement with the respective inner walls of the channels. Alternatively, for a stronger connection, a latching engagement may be provided between the channel and arm on one or more of the arms of the joint. For example, one or more of the arms may be provided with one or more outwardly projecting spring loaded fingers or latches designed for latching engagement with a corresponding opening in the respective channel.

In the preferred embodiment, one of the aligned channels at each corner has a cut out for engaging over the transversely projecting third arm of the connector, enabling the ends of the opposed upwardly and downwardly facing channels at that corner to be abutted so that the connector is completely enclosed and more or less invisible.

One of the side walls is provided with an opening, and a door is suitably hinged at one side of the opening to provide access to the interior of the cage. A suitable latch mechanism is provided between the opposite side of the door and the opening for holding the door closed. Preferably, a pair of opposed hinge connectors are provided at the upper and lower ends of the hinge side of the opening. The wall member surrounding the opening has a pair of opposed openings at its upper and lower edges adjacent the hinge side of the opening. The door has corresponding upwardly and downwardly facing bores at the upper and lower ends of its hinge side. Each hinge connector comprises a first part for retention in one of the bores in the door member, and a second part rotatably mounted in the first part for retention in the corresponding opening in the wall member. Preferably, at least the hinge side of the door is of similar channel section to the wall members, and the second part of the hinge connector is of similar shape to at least one of the limbs of the corner connectors.

This arrangement allows the cage to be assembled quickly and easily, requiring no tools, and, once assembled, the joints are more or less invisible and result in no projections which could possibly injure a cage occupant. The cage can also be taken apart relatively easily if desired.

BRIEF DESCRIPTION OF THE DRAWINGS

The present invention will be better understood from the following detailed description of a preferred embodiment, taken in conjunction with the accompanying drawings, in which like reference numerals refer to like parts, and in which:

FIG. 1 is an exploded view of a collapsible cage constructed according to a preferred embodiment of the present invention, showing the basic components;

FIG. 2 is an enlarged side elevation view of one corner joint of the cage, with portions cut away;

FIG. 3 is a sectional view on lines 3—3 of FIG. 2;

DESCRIPTION OF THE PREFERRED EMBODIMENT

FIG. 1 illustrates the basic components of a modular, collapsible cage structure according to a preferred embodiment of the present invention. The cage illustrated is particularly designed for birds, although a similar construction may be used for other animals.

Figure 6:
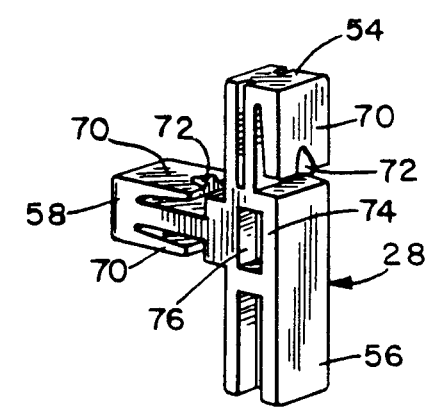
FIG. 6 is a perspective view of a corner connector.

The structure basically comprises a roof member 10, a base member 12, and four wall members 14, 16, 18 and 20 releasably secured to the four corners 22, 24 of the roof and base member, respectively, to form an enclosure. The roof member 10 may be of any desired type, and may be domed as shown in FIG. 1, flat, or arched if desired. Each member has a bore or channel at each of its corners, as explained in more detail below. Corner connectors or joints 28, illustrated in detail in FIG. 6, are provided at each of the four upper and lower corners 22, 24 of the cage for releasably connecting the components of the cage together at those corners by engaging in the bores of the respective three members at each corner.

One of the wall members 14 is provided with a frame 29 surrounding an opening 30 of any desired size in which a door panel 32 is hinged to provide access to the interior of the cage when assembled. A suitable latch mechanism 33 is provided between one side of the door and the adjacent side of the opening for holding the door in its closed position. Any suitable latch mechanism may be provided, but the latch mechanism is preferably as described in my co-pending Application filed on even date herewith, entitled "Door Latch".

One or more of the other wall members 16 may be provided with an opening 34 for releasably mounting a feeder 36 for providing the occupant of the cage with food and drink. Feeder 36 may be of any desired type, but the cage is preferably designed for attachment to the bird feeder described in my copending patent application filed on even date herewith, entitled "Bird Feeder". More than one opening 34 may be provided in the wall, if desired.

The base member comprises a rectangular frame 37 having four legs 38 attached at its corners, which may be mounted on caster wheels 40 as shown. A tray 42 for catching droppings, dropped food, feathers, dander and other debris is slideably mounted on the frame by suitable ledges (not shown). The tray has a raised rib configuration 43 on its bottom so that any paper or covering on the tray is raised above the bottom of the tray. This allows droppings to dry faster, reducing the risk of hazardous bacteria growth.

An apron 44 is slidably mounted on the legs above frame 37 as indicated in FIG. 1, and consists of a rectangular member open at its upper and lower ends and having outwardly slanted walls 46 surrounding the lower end of the cage and extending beyond its outer perimeter to catch any seeds, dander, feathers or other debris which may fall out of the cage instead of vertically downwards. The slanted walls direct debris downwardly into tray 42. Once the cage is assembled, frame 37 conceals the contents of tray 42 from view. A raised floor grate 48 is releasably mounted on the lower ends of the wall members to separate the birds from their droppings. Projections 50 from opposite side edges of the floor grate 48 are seated on the lower limbs 52 of opposite side walls 14, 18 as the cage is assembled, as indicated in FIG. 1, to retain the grate in position.

The various components of the cage are assembled and secured together using eight identical corner connectors 28, one of which is illustrated in more detail in FIG. 6. As shown in FIG. 6, each corner connector consists of a three way member having two aligned, oppositely directed arms 54, 56, and a third arm 58 projecting at right angles at the junction between the other two arms. The arms are preferably of square section as shown in FIG. 6, although alternative shapes such as cylindrical may be used if desired.

The bores at each of the corners of the cage members are of corresponding shape to that of the connector arms, and are orientated for receiving the respective arms. Thus two of the bores at each corner face one another for receiving the opposed aligned arms, while the other bore extends perpendicular to the first two. As indicated in FIGS. 1 and 2, the roof member 10 has downwardly facing bores or indents 60 at each of its four corners 22. The base member 12 has similar upwardly facing bores 62. The upper and lower ends of the side limbs 64 of one pair of opposed wall members 14 and 18 also have vertical bores 66, while the opposite ends of the upper and lower limbs 67, 68 of the other pair of opposed wall members 16 and 20 are provided with similar horizontal bores 69. Although in the preferred embodiment shown two of the bores and a corresponding two connector arms at each corner are aligned, all three bores and arms may extend perpendicular to one another in alternative arrangements.

In the preferred embodiment of the invention illustrated, the legs of the base 12 as well as the outer peripheral limbs of the wall members are all formed of metallic square, channel section bars or rods, with the leg bars being open at their upper ends. As illustrated in the drawings, each wall member is formed by connecting four lengths of square channel bar together, for example by welding, to form a rectangular frame, and then connecting a suitable grille across the frame. The corners of the wall members are formed such that the side bars of one pair of opposed wall members 14, 18 are open at their upper and lower ends, while the upper and lower bars of the other pair of opposed wall members are open at their opposite ends to form the bores for receiving respective corner connector arms, as explained in more detail below.

In order to make one of the corner connections, the three arms of a connector are inserted in the respective bores at that corner. In the embodiment illustrated, the three arms of the corner connector are each of slightly different structure. One of the aligned arms 56 is of straight, square section while the other arm 54 has one spring loaded finger 70 projecting rearwardly from its free end. Finger 70 has a rounded protruberance 72 at its free end. The perpendicular arm 58 has two opposing rearwardly projecting, fingers 70 identical to the single finger on arm 54. Thus the arms 54 and 58 each taper outwardly slightly in a rearward direction. Although the arms are all different in FIG. 6, they may be made identical to one another in alternative embodiments, for example with each arm having one or more resilient fingers 70, depending on the strength of connection needed. The central portion of the connector has a rectangular indentation 76 as best seen in FIGS. 2 and 6. The connector may be made of any suitable material, and may be of plastics material such as Lexan.

The bores at the abutting corners of the adjacent wall members and the roof or floor member are designed to receive the respective arms of the connectors as illustrated in FIG. 2, so that the connector is more or less completely hidden. FIG. 2 illustrates a connection at a lower corner of the cage. Typically, one of the aligned arms 56 is inserted in the open upper end of the base leg at that corner, while the other aligned arm 54 is inserted in the corresponding open lower end of the side limb of one of the walls at that corner. The side limb may have one or more latch openings 78 for latching or snap-fit engagement with protruberance 72 when the arm 54 is fully inserted, as illustrated in FIG. 2. Preferably, the side limb also has a cut-out or indent 80 for engaging over the transversely projecting connector arm 58 to enable the end of the side limb to extend over the connector and into abutment with the opposing end of the leg. The adjacent bore in the lower limb of the adjacent wall member engages over the transverse arm 58. As shown, the limb may have aligned openings 82 for latching or snap engagement with the protruberances on the ends of the opposite fingers 70 when the arm 58 is fully inserted. This provides a positive latching or locking engagement at the corners. The connection at the upper four corners is made in a similar manner, as indicated in FIG. 2.

In an alternative embodiment the latch openings in the wall member channel bars may be eliminated, with the connection being made by frictional engagement of the connector arms in the respective bores. This provides a simpler construction, and may be used where less strength is needed at the corners, for example in the case of small birds who would not have sufficient strength to force the components apart at the corners. By making one of the connector arms straight, so that it is simply in sliding engagement in the respective bore, both assembly and taking apart of the cage are made easier. Also, by inserting the straight arms of the connectors in the base legs at all of the lower corners, the cage structure may be lifted off its legs easily for cleaning or other purposes. If a more positive engagement is needed, an insert (not shown) may be provided for fitting in the rectangular cut out 76 at the center of the connector, the insert having an outwardly projecting, spring loaded or resilient portion for either frictional or latching engagement in the respective bore.

Figure 4:
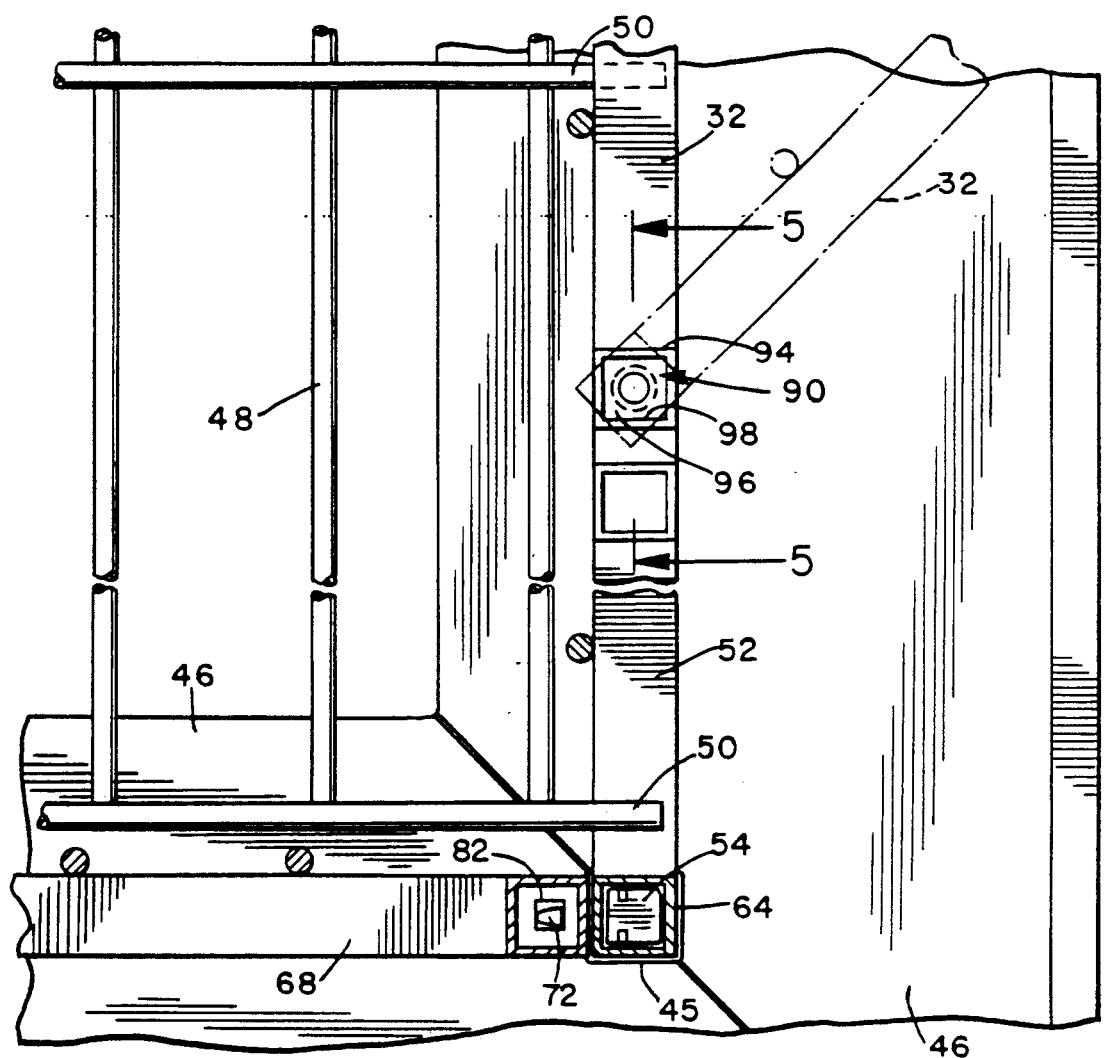
FIG. 4 is a sectional view taken on lines 4—4 of FIG. 2.
Figure 5:
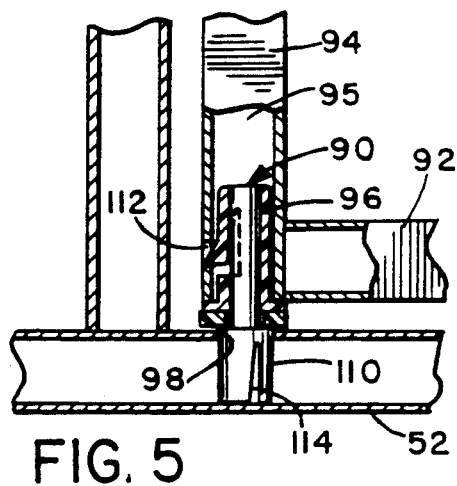
FIG. 5 is a sectional view taken on line 5—5 of FIG. 4.
Figure 7:
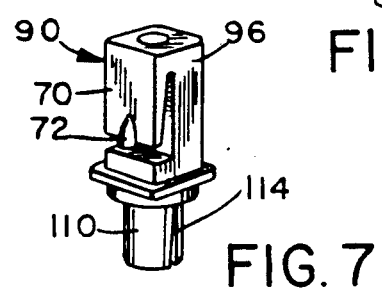
FIG. 7 is a perspective view of a door hinge pin.

FIGS. 4, 5 and 7 illustrate a hinge connection 90 between the door 32 and the wall member 14 surrounding the door opening 30. The door 32 is of a similar construction to the wall panels, consisting of peripheral upper and lower limbs 92 and side limbs 94 of square, channel section, with a grille work of spaced metal wires or rods extending across the space between the limbs. The side limbs 94 at one side edge of the door are open at their upper and lower ends to form bores 95 for receiving a first part 96 of hinge connector 90, while the wall member 14 has opposed transverse openings 98 in the upper and lower bars surrounding the opening adjacent one side edge for receiving the other part or pin 110 of the connector.

As shown in FIG. 7, the first part 96 is similar to one of the arms 54 of the corner connector, and equivalent reference numerals have been used as appropriate. Part 96 is designed for frictional or latching engagement in the respective end of the channel 95 at the hinge side of the door panel. The channel may have an opening 112 for latching engagement with the protruberance at the end of the spring loaded finger 70, or the part 96 may simply be a frictional fit in the bore. The second part 110 of the hinge connector comprises a pin rotatably mounted in part 96 for rotation about its axis. The pin has a split 114, so that when it is pushed through opening 98, the two portions of the pin will spread apart to retain the pin in the opening. The hinge connector may be made of any suitable material, for example a plastics material such as Lexan. In the preferred embodiment the part 96 is of Lexan or the like, while hinge pin 110 is of Delrin or similar material.

Because all of the corner connectors are identical, it is relatively easy to assemble the cage without needing to identify a number of different types of connector or fastener, as is often the case in other cage constructions. The various components of the cage can be transported, stored, and provided to customers in a collapsed condition, and can be easily assembled at the desired location. The apron or skirt is first placed over the upper ends of the legs 38, as indicated in FIG. 1. The side walls and roof can then be connected together and mounted on the base in a number of alternative sequences. For example, the side walls may be secured together and the roof mounted on the open upper end of the resultant enclosure prior to placing on the open upper end of the base structure. Alternatively, the side walls may first be connected to the base structure prior to connection to the roof.

In one possible construction sequence, the side walls are first all secured together to form a rectangular, open ended enclosure, using perpendicular arms 54 and 58 of the eight corner connectors. At each corner, the remaining arm, preferably arm 56, of the connector will project outwardly from the opening. At this point floor grate 48 can be located across one open end of the enclosure by locating projecting rod ends 50 on the lower limbs of two opposed side walls 14, 18. Downwardly projecting connector arms 56 can then be placed into the open upper ends of legs 38 at the lower four corners 24 of the cage. All that remains is for the roof 10 to be lifted onto the open upper end of the enclosure, with its bores or channels 60 at the corners of the roof engaging over the upwardly projecting connector arms 56. The door may be mounted prior to the cage assembly or once the cage has been assembled.

If desired, two or more cage enclosures may be stacked one on top of the other before mounting on a base structure.

Although the cage construction has been described above for a four sided, generally rectangular cage, clearly the same construction technique can be used for other cage shapes of different shapes, such as polygonal shapes involving five or more side walls.

This cage construction eliminates nut and bolt connectors which can be hazardous to birds and which detract from the smooth appearance of the cage. Assembly is quick and easy, with no tools required. Once assembled, the connectors are more or less completely hidden, making the cage more attractive in appearance, and cannot cause injury to any cage occupant. If the cage is to be transported to a different location, the cage components can be separated quickly and easily so that they take up significantly less space during transportation, and, on arrival, can be quickly snapped together using the corner connectors to set up the cage. The enlarged skirt or apron reduces the risk of debris escaping the cage and falling on the floor surrounding the cage, while the raised ribbing on the debris collecting tray will allow debris such as droppings to dry faster.

Although a preferred embodiment of the invention has been described above by way of example only, it will be understood by those skilled in the field that modifications may be made to the described embodiment without departing from the scope of the invention, which is defined by the appended claims.

I claim:

1. A cage structure, comprising;
    a roof member having corners;
    a base member having corners aligned with the corners of the roof member;
    each corner of the base and roof member having a bore;
    a series of rectangular wall members for releasably securing to the base and roof members to form an enclosure, each wall member having a bore at each of its upper and lower corners;
    a plurality of three-way connecting means releasably connecting the upper corners of adjacent wall members to a respective corners of the roof member and the lower corner of adjacent wall members to a respective corner of the base member, each connecting means comprising a connector having three arms releasably engaged in the bores in the members at each corner of the cage.

2. The structure as claimed in claim 1, wherein at least a major part of each connector is concealed within the bores at that corner when the cage is assembled.

3. The structure as claimed in claim 1, wherein each connector comprises two aligned arms extending in opposite directions from a central region, and a third arm extending from the central region at right angles to the aligned arms.

4. The structure as claimed in claim 3, wherein two of the bores at each corner are axially aligned and have open outer ends for receiving said aligned arms of said connector, one of the aligned bores at each corner having a cut out extending from the open outer end of the bore for extending the bore over the third arm of the connector into abutment with the end of the opposing aligned bore.

5. The structure as claimed in claim 1, wherein at least some of the connector arms and bores have interengageable latching means for releasable latching engagement between said connector arm and the respective roof, base or wall member.

6. The structure as claimed in claim 5, wherein at least some of said bores have latch openings adjacent to their open ends, said latching means comprising spring loaded latching members projecting transversely from at least one of said connector arms of each connector for latching engagement in said latch openings.

7. The structure as claimed in claim 1, wherein said bores and connector arms are of corresponding, square cross section.

8. The structure as claimed in claim 7, wherein said arms are a close fit in said bores for frictional engagement with said bores.

9. The structure as claimed in claim 7, wherein at least some of the arms of each connector taper outwardly from their free end towards the central region of the connector.

10. The structure as claimed in claim 1, wherein said roof member has a downwardly facing bore at each of its corners, said base member has an upwardly facing bore at each of its corners, and the longitudinal axes of the bores at the corners of each wall member are perpendicular to of
    the longitudinal axes of the bores at the corners of the next adjacent wall member.

11. The structure as claimed in claim 1, wherein the cage enclosure is of rectangular shape having a first and a second opposed pair of said rectangular wall members, each said rectangular wall member has a peripheral frame comprising four bars of square channel section, said first opposed pair of said rectangular wall members has upper and lower channel bars open at their opposite ends to provide said corner bores, and said second opposed pair of said rectangular wall members has side channel bars open at their upper and lower ends to form said corner bores.

12. The structure as claimed in claim 1, further including a door frame surrounding a door opening in one of said wall members, a door panel, hinge means for removably hinging one side of said door panel to one side of said opening, and interengageable latching means on the opposite sides of said door panel and opening for retaining said door panel in a closed position, said hinge means comprising a pair of hinge connectors each comprising a first part for connection to said door panel and a pin rotatably mounted in said first part for connection in the door opening, said door panel having a bore at its upper and lower corners at said one side for releasably receiving said first part of each connector, respectively, and said wall member frame having upwardly and downwardly facing openings adjacent said one side for releasably receiving said pin of each connector.

13. The structure as claimed in claim 12, wherein said first part of each hinge connector is identical to at least one arm of said connectors.

14. The structure as claimed in claim 1, wherein said base member includes a peripheral apron projecting outwardly from the cage enclosure for collecting debris falling outwardly from the cage enclosure.

15. The structure as claimed in claim 14, wherein said base member includes a removable tray below said apron for collecting debris, the structure further including a floor grate removably secured across a lower portion of the enclosure at a location raised above said removable tray.

16. The structure as claimed in claim 15, wherein said tray has a raised rib pattern in its bottom face for holding a cover sheet in the tray above the bottom face of the tray.

* * * * *